United States Patent

[11] 3,608,972

[72] Inventor Willy Rudszinat
 Dassendorf near Hamburg, Germany
[21] Appl. No. 786,932
[22] Filed Dec. 26, 1968
[45] Patented Sept. 28, 1971
[73] Assignee Hauni-werke Korber & Co. KG.
 Hamburg, Germany
[32] Priority Feb. 9, 1968, Jan. 2, 1968
[33] Great Britain
[31] 6479/68 and 306/68

[54] TRANSFER APPARATUS FOR ROD-SHAPED ARTICLES
 36 Claims, 13 Drawing Figs.
[52] U.S. Cl. ................................................ 302/2, 198/20 C
[51] Int. Cl. ............................................. B65g 53/00
[50] Field of Search ..................................... 302/2; 198/53, 20 C, 190, 165

[56] References Cited
UNITED STATES PATENTS
| 1,777,048 | 9/1930 | Molins | 198/20 C |
| 1,824,413 | 9/1931 | Stein | 198/20 C |
| 1,857,605 | 5/1932 | Rapley | 198/190 |
| 2,109,148 | 2/1938 | Gwinn | 198/20 C |
| 2,142,271 | 1/1939 | Herrmann | 198/20 C |
| 2,993,737 | 7/1961 | Stephen | 302/2 |
| 3,222,110 | 12/1965 | Kelly et al. | 302/2 |
| 3,280,961 | 10/1966 | McCombie | 198/165 X |
| 3,404,921 | 10/1968 | Vergales et al. | 302/2 |
| 3,410,607 | 11/1968 | Tempel | 302/2 |

FOREIGN PATENTS
| 439,337 | 12/1935 | Great Britain | 198/20 C |

Primary Examiner—Andres H. Nielsen
Attorney—Michael S. Striker

ABSTRACT: Apparatus for transporting filter rod sections or analogous rod-shaped articles comprises a pneumatic tube discharging a succession of articles which move lengthwise into one end of a channel defined by two walls at least one of which travels toward the other end of the channel to transport the articles sideways toward the inlet of a magazine. The width of at least a portion of the channel is slightly less than the diameter of an article.

PATENTED SEP 28 1971 3,608,972

INVENTOR
Willy Rudszuck

BY Richard J. Steiker
ATTORNEY

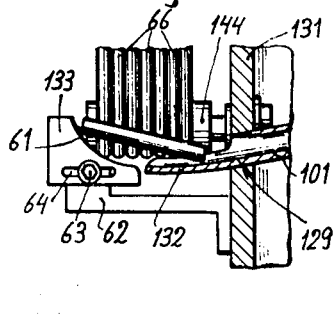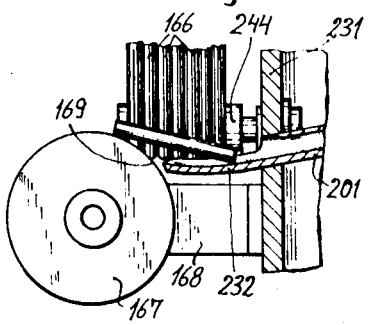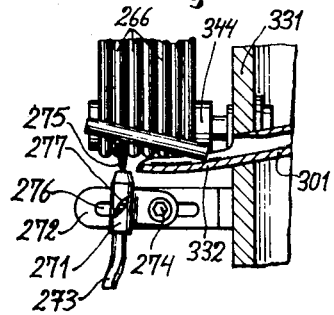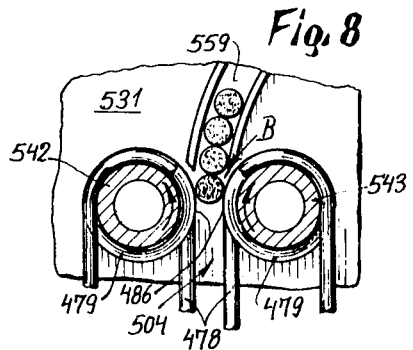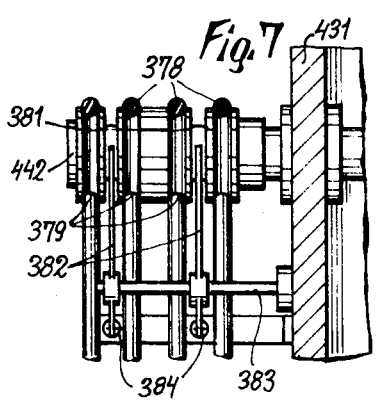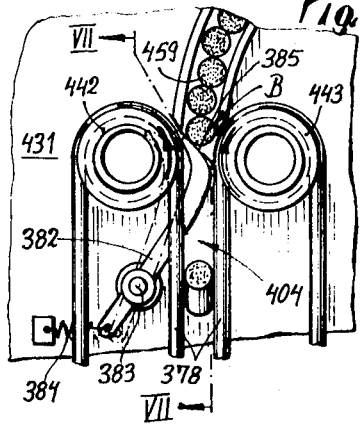

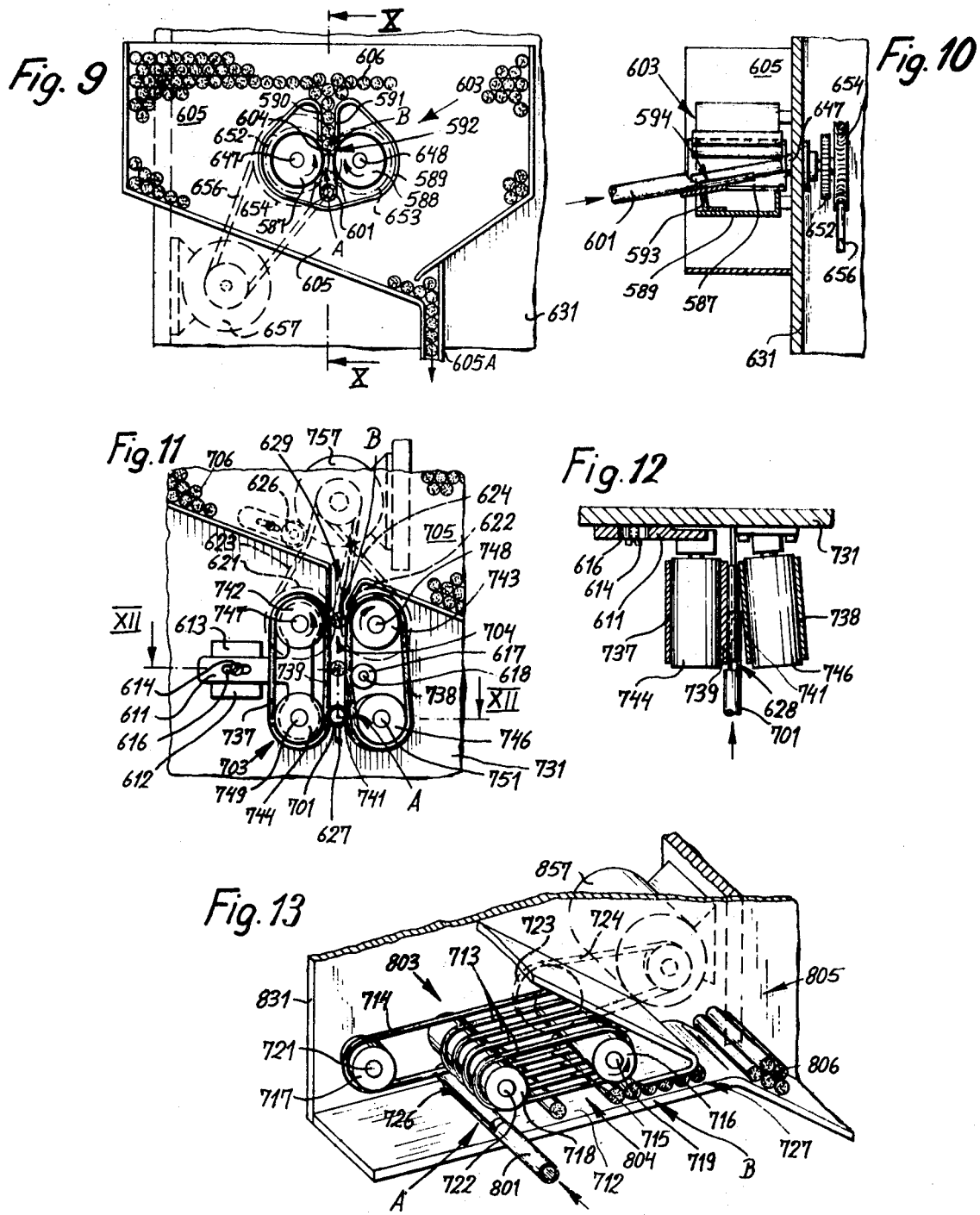

3,608,972

TRANSFER APPARATUS FOR ROD-SHAPED ARTICLES

BACKGROUND OF THE INVENTION

The present invention relates to transfer apparatus or transporting apparatus for rod-shaped articles, for example, for sections of filter rods, plain cigars or cigarillos, filter-tipped cigars or cigarillos, plain cigarettes, filter cigarettes, filter tips or the like. One of the presently preferred uses of the apparatus is to transport filter rod sections of cellulose or other plastic material, paper tubes or analogous parts of filter tips or finished filter tips to the magazine of a filter cigarette, cigar or cigarillo machine.

U.S. Pat. No. 3,222,110 to Kelly et al. discloses a cigarette transfer apparatus wherein cigarettes are fed axially through pneumatic lift tubes and are thereupon accelerated to provide spaces between successive cigarettes. The thus accelerated cigarettes are caused to descend by gravity sideways in a serpentine transfer device and ultimately enter a conventional collector or stacker. The output of such apparatus is limited because the speed at which the cigarettes descend in the serpentine transfer device depends on gravity. Furthermore, the collector must always be located at a level below the accelerating unit and hence below the pneumatic lift tubes. This is a serious drawback in installations where it is desirable to transport cigarettes from a lower level to a higher level or where the space which is available for mounting of the transfer apparatus is not suited for placing of the lifting tubes above the collector. Another drawback of the just described transfer apparatus is that it is not suited for delivery of cigarettes or like rod-shaped articles into magazines of packing machines wherein the level of articles fluctuates within a very wide range. Serpentine transfer devices are likely to become clogged and to cause lengthy interruptions in operation of the patented apparatus.

SUMMARY OF THE INVENTION

An object of my invention is to provide a novel and improved transfer apparatus which can transport components of smoking products, particularly filter rod sections, cigars, cigarillos, cigarettes or filter tips at a high rate of speed, in a small area, without any appreciable deformation of articles, through overhead or floor-mounted pneumatic tubes, and into upper, median or lower zones of magazines.

Another object of the invention is to provide a versatile transfer apparatus which can be converted for transportation of shorter, longer, thicker and/or thinner rod-shaped articles.

A further object of the invention is to provide a transfer apparatus which can be installed in presently known plants for the production of cigarettes, cigars, cigarillos or analogous smoking products with or without filter tips.

An additional object of the invention is to provide as apparatus which can transfer rod-shaped articles at a desired rate of speed independently of the rate at which such articles are being supplied thereto.

An ancillary object of the invention is to provide the transfer apparatus with novel means for changing the direction of movement of a succession of rod-shaped articles in a small area, without the danger of clogging and practically without any deformation of articles.

Still another object of the invention is to provide a transfer apparatus which can transport rod-shaped articles with the same facility either upwardly, downwardly, in a horizontal path or in any other direction.

The improved transporting apparatus is particularly suited for transfer of filter rod sections, cigarettes or like rod-shaped articles having a predetermined diameter. The apparatus comprises novel conveying means including a pair of adjacent but spaced walls defining a channel at least a portion of which has a width which is slightly less than the predetermined diameter and has a first end and a second end, and drive means for moving at least one of the walls from one end toward the other end of the channel. The apparatus further comprises a pneumatic tube or analogous feeding means for admitting articles lengthwise into the one end of the channel whereby the one wall moves the articles substantially sideways toward and beyond the other end of the channel, for example, into the inlet of a magazine or hopper.

The conveying means may include a pair of driven rollers whose peripheral portions constitute the walls, or such walls may form part of endless travelling belts whereby each wall may form part of a single flat belt or of a set of endless belts of circular cross-sectional outline. The channel may extend vertically upwardly, vertically downwardly, horizontally or in any other desired direction and the apparatus may be further provided with suitable deflecting means for deflecting the leading ends of successive axially moving particles sideways into the range of the travelling wall or walls in the conveying means.

The apparatus can be further provided with suitable blocking means which can prevent return movement of articles from the other toward the one end of the channel when the delivery of articles is terminated or interrupted, especially if the one end of the channel is located at a level below the other end. Such blocking means may comprise one or more spring-biased levers or it may form part of the conveying means.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 3 is a fragmentary vertical sectional view of a second apparatus;

FIG. 4 is a similar fragmentary vertical sectional view of a third apparatus;

FIG. 5 is a fragmentary vertical sectional view of a fourth apparatus;

FIG. 6 is a fragmentary elevational view of a fifth apparatus;

FIG. 7 is a sectional view as seen in the direction of arrows from the line VII—VII of FIG. 6;

FIG. 8 is a fragmentary partly elevational and partly sectional view of a sixth apparatus;

FIG. 9 is an elevational view of a seventh apparatus;

FIG. 10 is a vertical sectional view as seen in the direction of arrows from the line X—X of FIG. 9;

FIG. 11 is a fragmentary elevational view of an eighth apparatus;

FIG. 12 is a fragmentary horizontal sectional view as seen in the direction of arrows from the line XII—XII of FIG. 11; and FIG. 13 is a fragmentary perspective view of a further apparatus.

DESCRIPTION OF THE PREFERRED EMBODIMENTS

Figure 1:
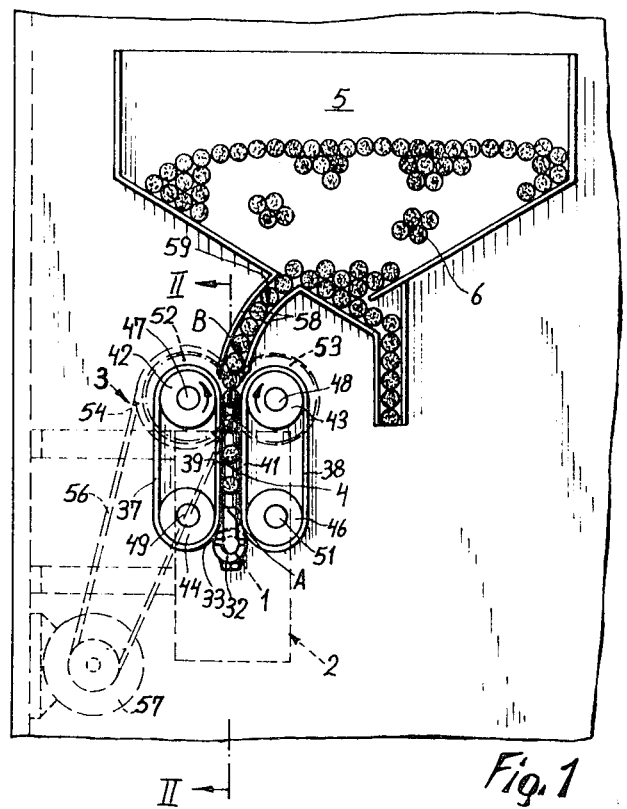
FIG. 1 is an elevational view of an apparatus which embodies one form of my invention.
Figure 2:
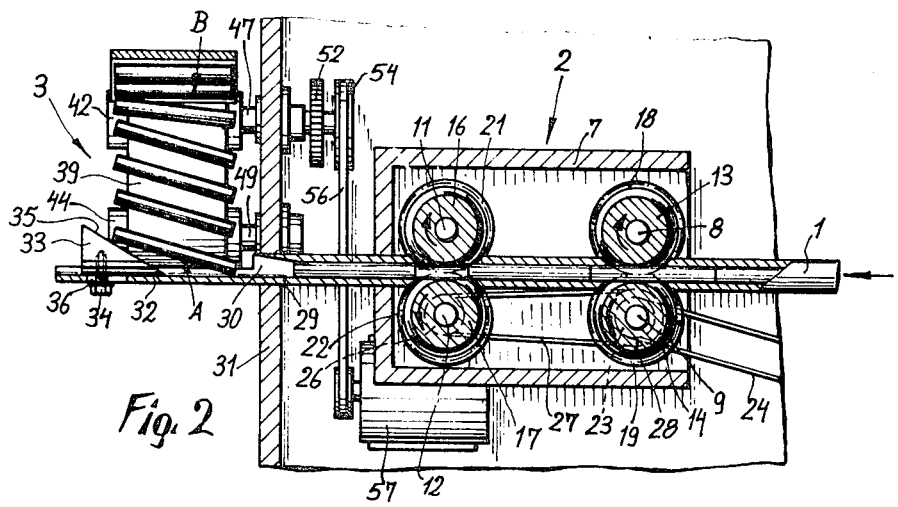
FIG. 2 is a fragmentary vertical sectional view as seen in the direction of arrows from the line II—II of FIG. 1.

The apparatus of FIGS. 1 and 2 comprises a feeding means including a pneumatic tube 1 which advances a succession of filter rod sections 6 lengthwise and in a direction to the left, as viewed in FIG. 2. The tube 1 can receive filter rod sections from a machine of the type disclosed, for example, in British Pat. No. 1,070,339. This tube cooperates with an accelerating or distancing unit 2 which serves to separate the filter rod sections 6 from each other so as to insure that the foremost section can be readily deflected sideways when it reaches the outlet of the tube 1. The apparatus further comprises a novel conveying unit 3 which accepts sections 6 at a first transfer station A and moves them sideways to a second transfer station B where the sections enter an upwardly extending inlet 59 of a magazine 5. The conveying unit 3 defines a substantially vertical channel 4 whose width is slightly less than the diameter of a filter rod section 6 and wherein the sections move sideways from the station A to the station B.

The aforementioned accelerating or distancing unit 2 comprises a casing 7 supporting the ends of four parallel horizontal shafts 8, 9, 11, 12 whose axes are normal to the axis of the tube 1. This tube extends through the casing 7 exactly midway between the axes of the two upper shafts 8, 11 and the two lower shafts 9, 12. The shafts 8, 9, 11, 12 respectively carry friction wheels 13, 14, 16, 17 each of which extends through a suitable cutout or window of the tube 1 so that the minimum distance between the wheels 13, 14 and 16, 17 is slightly less than the diameter of a filter rod section 6. The shafts 8, 9, 11, 12 further carry gears 18, 19, 21, and 22. The gears 18, 21 respectively mesh with the gears 19, 22 and the diameters of all of these gears are the same. The shaft 9 is provided with a sprocket wheel 23 driven by an endless chain 24 which is trained over a further sprocket wheel, not shown, provided on the output shaft of a variable speed electric motor or another suitable prime mover. The shaft 9 drives the shaft 8 at the same speed but in opposite direction by way of intermeshing gears 18, 19, and the shaft 9 further carries a second sprocket wheel 28 which drives a sprocket wheel 26 on the shaft 12 by way of an endless chain 27. The shaft 12 drives the shaft 11 by way of intermeshing gears 21, 22. The diameter of the sprocket wheel 28 is greater than that of the sprocket wheel 26 so that the shafts 11, 12 are driven at a speed which is somewhat higher than the speed of the shafts 8, 9. The purpose of the just described driving arrangement is to rotate the friction wheels 13, 14 at the same speed but in opposite directions and to rotate the friction wheels 16, 17 at the same speed (which, however, is higher than the speed of friction wheels 13, 14) and in opposite directions. Such directions are indicated by arrows.

The front part of the pneumatic feeding tube 1 extends through a hole 29 in a panel 31 of the frame and has an outlet 30 which is located immediately adjacent to the left-hand side of the panel 31, as viewed in FIG. 2, as well as a trough-shaped extension or front end portion 32 which extends forwardly beyond the outlet 30 and is of substantially semicircular cross-sectional outline. The panel 31 is located in a vertical plane and is normal to the axis of the tube 1. The extension 32 accommodates a portion of an adjustable deflecting member or wedge 33. The distance between the wedge 33 and the outlet 30 approximates the length of a filter rod section 6 and this wedge is installed at the transfer station A. Its function is to direct the leading ends of successive filter rod sections 6 upwardly into the aforementioned vertical channel 4 so that such sections can enter the conveying unit 3 to be transported sideways toward and beyond the transfer station B. The wedge 33 is provided with an upwardly inclined straight guide face 35 along which the leading ends of successive sections 6 travel after they emerge from the outlet 30 of the tube 1. The bottom portion of the extension 32 has an elongated slot 36 for a screw 34 which is threaded into the wedge 33 and can arrest the latter in one of a large number of different positions.

The conveying unit 3 comprises two endless flat belts 37, 38 having inner stretches 39, 41 which constitute two upwardly travelling walls of the conveying unit and flank the channel 4. These belts are respectively trained over driven rollers 42, 43 and over idler rollers 44, 46. The diameters of the rollers 42–44 and 46 are identical and these rollers are respectively mounted on horizontal shafts 47, 48, 49, 51. The shafts are mounted in the panel 31 in such a way that the inner stretches or walls 39, 41 of the belts 37, 38 are parallel to each other and that the width of the channel 4 is slightly less than the diameter of a filter rod section 6. The axis of the feeding tube 1 is located in a vertical plane which halves the channel 4. Furthermore, the tube 1 is installed at such a level that the leading end of a filter rod section 6 which slides along the guide face 35 of the wedge 33 enters the lower end of the channel 4 and is engaged by the upwardly travelling walls 39, 41 only after its trailing end moves beyond the outlet 30.

The shafts 47, 48 extend beyond the panel 31 and carry mating gears 52, 53 of identical diameter. The shaft 47 further carries a pulley 54 which is driven by an endless belt 56. The latter is trained over a second pulley on the output shaft of a variable-speed electric motor 57. The receiving end of the inlet 59 is located at the transfer station B and this inlet includes two arcuate guide walls 58. The discharge end of the inlet 59 admits successive filter rod sections 6 into the bottom zone of the magazine 5. The width of the inlet 59, as seen at right angles to the plane of FIG. 1, is slightly greater than the length of a section 6.

The operation:

The tube 1 advances a succession of filter rod sections 6 lengthwise toward the accelerating unit 2. The rear friction wheels 13, 14 engage successive sections 6 and advance them at a predetermined speed. The sections then reach the front friction wheels 16, 17 and are accelerated so that the section which is engaged by those friction wheels moves ahead of and away from the next following section. Each of the thus accelerated sections 6 travels through the outlet 30 and its leading end engages and slides upwardly and forwardly along the inclined guide face 35 of the wedge 33. The position of the wedge 33 is selected in such a way that a section 6 whose leading end slides along the guide face 35 enters the lower end of the channel 4 and is engaged by the travelling walls 39, 41 after its trailing end moves beyond the outlet 30. Thus, each section 6 begins to move substantially sideways (upwardly) when it enters the first transfer station A.

The motor 57 drives the walls 39, 41 at the same speed whereby these walls transport the sections 6 upwardly from the station A toward and beyond the transfer station B so that the sections enter the receiving end of the inlet 59. Each preceding section 6 is pushed upwardly through the inlet 59 by the next following section so that it ultimately enters the bottom zone of the magazine 5. The walls 39, 41 engage the sections gently and without any appreciable deformation. This is due to the fact that the guide face 35 lifts the leading ends of successive sections onto the lower end of the channel 4.

It is to be noted that the accelerating unit 2 constitutes an advantageous but optional part of my apparatus. This accelerating unit is desirable when the ends of the sections 6 are rather soft; however, the apparatus can operate properly without the unit 2, i.e., the ends of successive sections 6 can abut against each other during travel toward the transfer station A.

FIG. 3 illustrates the first transfer station in a slightly modified apparatus. Those parts of this apparatus which are clearly analogous to or identical with the corresponding parts of the previously described apparatus are denoted by similar reference numerals plus 100. The discharge end of the pneumatic feeding tube 101 is inclined downwardly and its extension 132 is of arcuate shape so that it insures gradual transfer of successive filter rod sections toward the concave guide face 61 of a modified deflecting member 133. Furthermore, the deflecting member 133 is mounted on a holder here shown as a bracket 62 which forms part of the frame and is affixed to the panel 131. The deflecting member 133 has an elongated slot 64 for the stem of a screw 63 which is threaded into the bracket 62. The screw 63 permits lengthwise as well as angular adjustments of the deflecting member 133. The configuration of the concave guide face 61 is such that it insures gradual advance of the leading end of a filter rod section into the lower end of the channel in the conveying unit. This conveying unit comprises two upwardly travelling walls each of which is formed by a set of closely adjacent round belts 66 which are trained over driven and idler rollers (see the idler roller 144). The operation of the apparatus shown in FIG. 3 is clearly analogous to that of the apparatus which is illustrated in FIGS. 1 and 2. The round belts 66 may consist of elastic material. It is equally possible to employ in the apparatus of FIG. 3 a set of round belts 66 and one of the flat belts 37, 38 shown in FIGS. 1 and 2.

The apparatus of FIG. 4 constitutes a modification of the apparatus shown in FIG. 3 and certain of its parts are denoted by similar reference numerals plus 100. The deflecting member 133 of FIG. 3 is replaced by a movable roller-shaped deflecting member 167 which is freely rotatable on a shaft carried by a holder or bracket 168 secured to the panel 231. The cylindrical peripheral surface 169 of the roller 167 is located in the path of movement of filter rod sections and causes the leading ends of such section to move forwardly and upwardly and into the range of upwardly travelling walls of the conveying unit. Each of these walls is formed by the inner stretches of two sets of endless round belts 166 (only one set shown). When the leading end of a filter rod section engages a point on the peripheral surface 169, such point receives from the axially advancing section a movement having a component in the longitudinal direction of the section and an upwardly directed component which latter causes the leading end to move toward and to be engaged by the inner stretches of the belts 166. The inclination of the extension 232 of the tube 201 is such that the axis of each section which engages the peripheral surface 169 is nearly tangential to the roller 167. The latter begins to turn in a counterclockwise direction in response to frictional engagement with the advancing filter rod section and thereby assists the leading end of such section to move into the range of the belts 166. Such mounting of the roller 167 insures that the leading ends of filter rod sections are lifted practically without friction. It is clear that the roller 167 can be replaced by a movable endless belt or band which is mounted in such a way that it can be set in motion by the leading ends of filter rod sections. Thus, the roller 167 can constitute a pulley and the just mentioned belt or band is then trained over such pulley to be set in motion by successive filter rod sections.

The apparatus of FIG. 5 constitutes a further modification of the apparatus shown in FIG, 3 or 4 and certain parts thereof are denoted by reference numerals similar to those employed in FIG. 3 plus 200. The deflecting member 133 or 167 is replaced by at least one deflecting nozzle 271 which is adjustably secured to a holder or bracket 272 provided on the panel 331. The stream 275 of air which is discharged by the orifice or orifices of the nozzle 271 impinges at an acute angle against the leading ends of successive filter rod sections and causes the leading ends to move upwardly into the range of the inner stretches of belts 266. The nozzle 271 is connected with a compressor or another suitable source of compressed gas by a supply conduit 273. The means for adjustably securing the nozzle 271 to the holder 272 comprises a screw 274 which passes through an elongated slot 276 of the holder. This screw enables the operator to adjust the nozzle 271 in several directions so as to select the distance between the outlet of the tube 301 and the stream 275 as well as the angle between the stream and the axes of successive filter rod sections. The nozzle 271 is further provided with a throttle valve 277 which can be adjusted to determine the strength of the air stream 275. The longitudinal and/or angular adjustment of the nozzle 271, as well as the adjustment of the valve 277, are selected in dependency on the speed and/or dimensions of filter rod sections. The airstream 275 effects gentle deflection of leading ends of successive filter rod sections so that the sections can be moved into the range of belts 266 without any noticeable deformation. Such apparatus can be used for transfer of readily deformable rod-shaped articles.

The apparatus of FIGS. 6 and 7 comprises many parts which are analogous to the parts of the apparatus illustrated in FIGS. 1 and 2. Such parts are denoted by similar reference numerals plus 400. For example, the numeral 431 denotes the vertical panel of the frame, the numeral 404 denotes the channel defined by the conveying unit, and the numeral 459 denotes the inlet of the magazine. The flat belts 37, 38 of FIGS. 1–2 are replaced by two sets of round belts 378 which extend into annular grooves 379 of semicircular outline provided in the driven rollers, 442, 443. The roller 442 is provided with additional annular grooves 381 which are disposed between the respective belts 378 and can accommodate portions of two-armed spring-biased blocking levers 382. These levers are pivotable on a common pin 383 which is carried by the panel 331 and is parallel to the axes of the rollers 442, 443. The purpose of the blocking levers 382 is to hold the filter rod sections against downward or backward movement at the transfer station B. Each of these levers has a rounded blocking or arresting head 385 and each thereof is biased by a helical spring 384 so that it tends to move its head 385 into the upper end of the channel 404 to thereby hold the lowermost filter rod section in the inlet 459 against downward movement back into the upper end of the channel 404. The heads 385 are then held at such a level that the lowermost filter rod section resting on the heads is held away from contact with the belts 378.

When the apparatus is in operation, the filter rod sections which are caused to travel upwardly in the channel 404 pivot the blocking levers 382 against the opposition of springs 384 so that the heads 385 enter the adjoining annular grooves 381 and permit further upward movement of filter rod sections into the inlet 459. When the delivery of filter rod sections is terminated, the springs 384 contract and pivot the blocking levers 382 to the blocking or arresting positions shown in FIG. 6 whereby the heads 385 automatically prevent return movement of filter rods sections into the channel 404. The drive for the rollers 442, 443 need not be arrested because the heads 385 hold the lowermost filter rod section away from the adjoining portions of belts 378.

In the apparatus of FIG. 8, the function of blocking levers 382 is taken over by the driven rollers 542, 543 for the round belts 478. These rollers are mounted on the panel 531 which also supports the inlet 559 of the magazine. The channel of the conveying unit is shown at 504. The relatively shallow grooves 379 of FIG. 7 are replaced by deeper annular grooves 479 which can fully accommodate the adjoining portions of the round belts 478 so that the peripheral surfaces 486 of the rollers 542, 543 extend very slightly beyond the end turns of these belts. Such peripheral surfaces 486 are precision finished and the minimum distance between the rollers 542, 543 is only slightly less (by one or more tenths of a millimeter) than the minimum distance between the inner stretches of the belts 478 (i.e., the width of the major part of the channel 504).

In normal operation of the apparatus shown in FIG. 8, the inner stretches of the belts 478 transport successive filter rod sections sideways, i.e., upwardly through the channel 504, through the second transfer station B and into the inlet 559. These belts move the filter rod sections into the narrowest portion of the channel 504 between the peripheral surfaces 486 of the driven rollers 542, 543 whereupon the slightly compressed sections move through and beyond the station B. The actual transfer of successive filter rod sections into the inlet 559 is effected by the peripheral surfaces 486. When the delivery of filter rod sections into the channel 504 is terminated, the last or lowermost filter rod section moves between and beyond the peripheral surfaces 486 and is thereupon held by such surfaces against downward movement back into the channel 504. The lowermost filter rod section is then held away from contact with the adjoining portions of the belts 478 because such portions of the belts are fully accommodated in the respective annular grooves 479.

Referring now to FIGS. 9 and 10, those parts of the apparatus shown in these illustration which are analogous to the parts of the apparatus shown in FIGS. 1 and 2 are denoted by similar reference numerals plus 600. The discharge end of the pneumatic feeding tube 601 is located within the confines of the magazine 605. The motor 657 is a variable-speed motor or it drives the belt 656 by way of a variable-speed transmission. The conveying unit 603 of this apparatus comprises two rollers 587, 588 whose peripheral portions constitute two upwardly travelling walls which define between themselves a channel 604 having a width which is slightly less than the diameter of a filter rod section 606. The diameters of the rollers 587, 588 are the same and their axes are parallel to each other and to the axes of filter rod sections in the magazine 605. The shafts of the rollers 587, 588 are shown at 647, 648 and the axial length of each of these rollers approximates the length of a filter rod section 606. The conveying unit 603 of the apparatus shown in FIGS. 9 and 10 further comprises a housing 589 which is installed in a median portion of the magazine 605 and accommodates the major portions of conveying rollers 587, 588 The housing 589 is affixed to the panel 631 and has two substantially vertical parallel sidewalls 590, 591 corresponding to the walls 58 of FIG. 1 and defining an elongated channel which is an extension of the channel 604. The receiving end of such extension of the channel 604 is shown at 592. The distance between the walls 590, 591 is preferably slightly greater than the diameter of a filter rod section 606. The receiving end 592 is located at the transfer station B. The other transfer station A accommodates the discharge end of the pneumatic tube 601. The axis of this tube is located in a vertical plane which halves the channel 604 and the tube is inclined upwardly (see FIG. 10) so that the leading end of each successive filter rod section 606 initially engages those ends of the rollers 587, 588 which are adjacent to the panel 631. A holder or bracket 593 secures the discharge end of the tube 601 to the housing 589. The numeral 594 denotes the outlet of the tube 601.

The operation of the apparatus shown in FIGS. 9 and 10 is as follows:

The conveying rollers 587, 588 are driven by gears 652, 653, pulley 654 and belt 656 from the output shaft of the variable-speed motor 657. These rollers rotate at the same speed but in opposite directions. In order to properly synchronize the speed of rollers 587, 588 with the speed at which the filter rod sections 606 are supplied by the tube 601, the speed of the motor 657 is adjustable within a wide range. The leading end of each successive filter rod section 606 advances between the front axial ends of the rollers 587, 588 toward the panel 631 and is engaged by the rear or inner axial ends of these rollers to be thereupon transported sideways (i.e., upwardly) through the channel 604 and through the extension of this channel between the sidewalls 590, 591. Each filter rod section 606 assumes a substantially horizontal position after it passes through the receiving end 592 and thereupon moves sideways to enter the interior of the magazine 605. Each section 606 which enters the extension of the channel between the sidewalls 590, 591 is pushed upwardly by the next following section. The character 605A denotes an outlet by way of which the filter rod sections 606 leave the magazine 605 to enter a filter cigarette machine or another consuming machine. In the apparatus of FIGS. 9 and 10, the function of the deflecting member is taken over in part by the discharge end of the tube 601 and in part by the conveying rollers 587, 588. Furthermore, a portion of the magazine 605 (namely, the sidewalls 590, 591) forms part of the conveying unit in that these walls define an extension of the channel 604 between the conveying rollers 587, 588.

FIGS. 11 and 12 illustrate portions of a further transfer apparatus wherein all such parts which are analogous to the parts of the apparatus shown in FIGS. 1 and 2 are denoted by similar reference numerals plus 700. The shafts 747 and 749 are mounted on a T-shaped carriage 611 in such a way that their axes are parallel to each other and to the axes of filter rod sections 706 in the magazine 705. The carriage 611 is reciprocable along guide rails 612, 613 to thereby displace the rollers 742, 744 and the corresponding endless belt 737. In this way, the operator can change the width of the channel 704 so that the apparatus can transfer different types of filter rod sections 706 or analogous rod-shaped articles. The upwardly travelling inner stretches or walls of the belts 737, 738 are respectively shown at 739, 741; these stretches flank the channel 704. The carriage 611 is formed with an elongated slot 616 which is normal to the stretch 739 and accommodates the stem of a screw 614 meshing with the panel 731. The screw 614 and the slot 616 constitute a means for adjustably securing the carriage 611 to the panel 731.

The shafts 748, 751 for the right-hand rollers 743, 746 of FIG. 11 are rotatably mounted in the panel 731 in such a way that the axis of the roller 746 is inclined with reference to the axis of the shaft 748 (and with reference to the axes of shafts 747, 749 on the carriage 611) in order to provide the channel 704 with a tapering lower end whose width diminishes in a direction toward the panel 731, i.e., away from the discharge end of the pneumatic feeding tube 701. The minimal distance between the belts 737, 738 at the lower end of the channel 704 is slightly less than the diameter of a filter rod section 706 and the maximum width of this lower end is slightly greater than the diameter of a filter rod section.

An intermediate roller 617 of small diameter is freely rotatable on a horizontal shaft 618 which is mounted on the panel 731. The roller 617 deforms an intermediate portion of the inner stretch 741 of the belt 738 so that the width of the channel 704 at a level above the roller 617 is substantially constant. Such width is slightly less than the diameter of a filter rod section 706.

The shafts 747, 748 extend through and beyond the panel 731 and carry pulleys 621, 622 of identical diameter. The motor 757 is of the variable-speed type and drives the pulley 621 by way of a first belt 623. A crossed second belt 624 drives the pulley 622 so that the belts 737, 738 travel at the same speed and that their inner stretches 739, 741 travel upwardly. A tensioning roll 626 is adjustably mounted on the panel 731 to maintain the belt 623 under requisite tension. The roll 626 is adjusted upon adjustment of the carriage 611 with reference to the panel 731.

The discharge end of the pneumatic feeding tube 701 is parallel to the axes of the shafts 747–749. This discharge end is located at the transfer station A and is secured to the panel 731 by a holder or bracket 627. The axis of the discharge end of the tube 701 is located at a level slightly above the axes of the lower rollers 744, 746. The arrangement is such that the leading end of a filter rod section 706 which emerges from the tube 701 is free to advance between the lower ends of the inner stretches 739, 741 toward the panel 731 and is engaged by such inner stretches when its trailing end is free to leave the tube 701. The discharge end of the tube 701 is formed with an outlet 628 to facilitate evacuation of trailing ends of filter rod sections 706. A mouthpiece or gate 629 is provided in he magazine 705 as a substitute for the inlet 59 and serves to guide successive filter rod section 706 into the interior of the magazine.

The operation:

The motor 757 drives the belts 737, 738 by way of rollers 742, 743, pulleys 621, 622 and belts 623, 624. The inner stretches 739, 741 of the belts 737, 738 travel upwardly at the same speed so that their lower ends entrain the leading ends of successive filter rod sections 706 which are fed by the tube 701. Each filter rod section 706 is engaged by the inner stretches 739, 741 when its trailing end is free to leave the outlet 628 of the tube 701. The belts 737, 738 transport the sections 706 upwardly and force them to enter the magazine 705 by way of the inlet or mouthpiece 629.

In the apparatus of FIG. 13, all such parts which are analogous to those of the apparatus of FIGS. 1 and 2 are denoted by similar reference numerals plus 800. The conveying unit 803 is mounted externally of and adjacent to the magazine 805 for filter rod sections 806. This conveying unit comprises a stationary wall 712 which flanks a nearly horizontally channel 804 from below, and a travelling wall formed by the lower stretches 715 of a set of endless round belts 713 trained over rollers 716, 718 whose shafts 719, 722 are mounted on the panel 831. A longer endless round belt 714 is trained over the roller 716 and over a further roller 717 having a shaft 721 which is mounted on the panel 831. The rollers 716–718 have identical diameters and their shafts are located in a common plane which is parallel to the plane of the wall 712. The number and distribution of shorter belts 713 are selected in such a way that they engage successive filter rod sections 806 at several points substantially all the way between the ends of the sections which travel in the channel 804. The width of the channel 804 is slightly less than the diameter of a filter rod section. Furthermore, the left-hand portion of the inner (lower) stretch of the longer belt 714 is installed at such a distance from the wall 712 that it invariably intercepts the leading ends of successive filter rod sections 706 which emerge from the outlet 726 of the feeding tube 801. Such end portion of the belt 714 causes the leading ends of sections 806 to advance sideways toward the inner stretches 715 of the shorter belts 713 so that the sections are thereupon caused to roll along the wall 712 and toward the station B which is followed by a channel 727 constituting an extension of the channel 804 and the inlet of the magazine 805. The belt 714 also prevents the leading ends of filter rod sections 806 from striking and from rebounding on impact against the panel 831. The discharge end of the tube 801 is affixed to he wall 712 and/or to the panel 831 immediately adjacent to the left-hand end of the channel 804, i.e., at the first transfer station A. The axis of the discharge end of the tube 801 is parallel to the axes of shafts 719, 721, 722 and is located in the central symmetry plane of the channel 804. The roller 716 is driven by the variable-speed motor 857 by way of a belt 724 and pulley 723 to move the belts 713, 714 at the same speed whereby the inner stretches 715 travel in a direction from the station A toward the station B. The leading ends of successive filter rod sections 806 admitted by the tube 801 slide along the upper side of the wall 712 and are engaged by the left-hand portion of the longer belt 714 to move into engagement with the inner stretches 715 of the belts 713. The sections 806 then roll in the channel 804, through the transfer station B and inlet 727 and enter the magazine 805.

A very important advantage of he improved apparatus is that the operation of the conveying unit need not be synchronized with the operation of the machine which supplied filter rod sections or other rod-shaped articles to the pneumatic feeding tube. Furthermore, the direction of travel of successive articles is changed gently without any appreciable deformation. Still further, the apparatus occupies little room and its parts may be mounted below, laterally adjacent to or even in the interior of a magazine. Moreover, the apparatus can be readily and rapidly adjusted to transport shorter, longer, larger diameter and/or smaller diameter articles at a speed which can be varied within a wide range.

Without further analysis, the foregoing will so fully reveal the gist of the present invention that others can, by applying current knowledge, readily adapt it for various applications without omitting features which fairly constitute essential characteristics of the generic and specific aspects of my contribution to the art.

What is claimed as new and desired to be protected by Letters Patent is set forth in the appended claims:

1. Apparatus for transporting rod-shaped articles of predetermined diameter, particularly sections of tobacco-containing rods, comprising a conveying unit and a feeding unit, one of said units being arranged to deliver articles to the other unit and said feeding unit comprising a pneumatic tube wherein the articles are transported lengthwise, said conveying unit comprising at least two adjacent but spaced walls defining a channel wherein the articles are conveyed sideways and at least a portion of which has a width which is slightly less then said diameter, said channel having a first end and a second end and said conveying unit further comprising drive means for moving at least one of said walls from one end toward the other end of said channel to thereby transport the articles through the channel.

2. Apparatus as defined in claim 1, wherein said conveying unit comprises a roller having a circumferentially complete peripheral portion which constitutes said one wall.

3. Apparatus as defined in claim 1, wherein said conveying unit comprises at least one endless belt and wherein said belt constitutes said one wall.

4. Apparatus as defined in claim 1, wherein said conveying unit comprises a plurality of endless belts which constitute said one wall.

5. Apparatus as defined in claim 4, wherein each of said belts is of substantially circular cross-sectional outline.

6. Apparatus as defined in claim 1, further comprising means for adjusting at least one of said walls with reference to the other wall to thereby select the width of said channel.

7. Apparatus as defined in claim 1, further comprising blocking means operative to prevent return movement of articles into said channel.

8. Apparatus as defined in claim 7, wherein said blocking means comprises at least one spring-biased blocking lever.

9. Apparatus as defined in claim 7, wherein said blocking means comprises a pair of driven rollers forming part of said conveying means and defining said other end of said channel, the minimum distance between said rollers being at least slightly less than said diameter.

10. Apparatus as defined in claim 1, further comprising a magazine for articles, said magazine having inlet means adjacent to the other end of said channel.

11. Apparatus as defined in claim 10, wherein said feeding unit comprises an outlet located within the confines of said magazine.

12. Apparatus as defined in claim 10, wherein aid magazine comprises a lower zone and said inlet means is arranged to admit articles into the lower zone of said magazine.

13. Apparatus as defined in claim 10, wherein said feeding unit is arranged to admit articles into said channel lengthwise in such direction that the axes of articles make an oblique angle with the direction of travel of said one wall.

14. Apparatus as defined in claim 1, wherein one of said walls is stationary and wherein said walls are located one above the other.

15. Apparatus as defined in claim 1, wherein said drive means comprises means for moving said one wall at a plurality of speeds.

16. Apparatus as defined in claim 1, wherein said one end is located at a level below the other end of said channel.

17. Apparatus as defined in claim 1, further comprising accelerating means for increasing the distance between successive articles prior to delivery of articles from said one unit to said other unit.

18. Apparatus for transporting rod-shaped articles of predetermined distance between a magazine and a processing machine, particularly for transporting sections of filter rods or tobacco-containing rods, comprising a conveying unit operatively connected with the magazine and a feeding unit operatively connected with the processing machine, one of said units being arranged to deliver articles to the other unit along a first path and said other unit being arranged to transport the thus delivered articles along a second path which is inclined with reference to said first path, said feeding unit comprising a pneumatic tube wherein the articles are transported lengthwise and said conveying unit comprising at least two adjacent but spaced walls defining a channel wherein the articles are conveyed sideways and at least a portion of which has a width which is slightly less than said diameter, said channel having a first end and a second end and said conveying unit further comprising drive means for moving at least one of said walls from one end toward the other end of said channel to thereby transport the articles through the channel.

19. Apparatus for converting a single file of exactly aligned rod-shaped articles having a predetermined diameter, particularly sections of filter rods or tobacco-containing rods, into at least one row of articles wherein the articles are disposed side by side, comprising a pneumatic unit for transporting the single file of articles and a mechanical unit for conveying the row of articles, one of said units having an outlet which discharges successive articles and the other unit comprising at least two adjacent but spaced walls defining a channel at least a portion of which has a width which is slightly less than said diameter, said channel having a first end and a second end and said other unit further comprising drive means for moving at least one of said walls from one end toward the other end of said channel to thereby transport the articles through the channel, and deflecting means for continuously deflecting successive articles which issue from the outlet of said one unit into the one end of said channel.

20. Apparatus as defined in claim 19, wherein said deflecting means comprises means for mechanically deflecting the articles.

21. Apparatus as defined in claim 19, wherein said deflecting means is stationary.

22. Apparatus as defined in claim 19, wherein said deflecting means has a curved deflecting surface for articles.

23. Apparatus as defined in claim 19, wherein said deflecting means comprises a mobile article-deflecting member.

24. Apparatus as defined in claim 19, wherein said deflecting means comprises means for producing at least one article-deflecting stream of compressed gaseous fluid.

25. Apparatus as defined in claim 24, wherein said stream producing means comprises at least one nozzle which directs the stream of compressed gas across the path of articles issuing from said outlet.

26. Apparatus as defined in claim 19, further comprising means for adjusting the position of said deflecting means with reference to at least one of said units.

27. Apparatus for transporting rod-shaped articles of predetermined diameter, particularly sections of filter rods, comprising conveying means including a pair of adjacent but spaced walls defining a channel at least a portion of which has a width which is slightly less than said diameter, said channel having a first end and a second end, and drive means for moving at least one of said walls from one toward the other end of said channel, said one wall consisting of a plurality of endless belts including at least one shorter belt and at least one longer belt; and feeding means for admitting articles lengthwise into said one end of the channel whereby said one wall moves the articles substantially sideways toward and beyond the other end of said channel, the articles admitted by said feeding means being engaged and moved sideways first by said longer belt and thereupon at least by said shorter belt.

28. Apparatus for transporting rod-shaped articles of predetermined diameter, particularly sections of tobacco-containing rods, comprising a conveying unit and a feeding unit, said feeding unit being arranged to deliver articles to said conveying unit and said feeding unit comprising a pneumatic tube wherein the articles are transported lengthwise, said conveying unit comprising at least two adjacent but spaced walls defining a channel wherein the articles are conveyed sideways and at least a portion of which has a width which is slightly less than said diameter, said channel having a first end and a second end and said conveying unit further comprising drive means for moving at least one of said walls from one end toward the other end of said channel to thereby transport the articles through the channel, said walls converging toward each other in the direction of lengthwise travel of articles in said tube.

29. Apparatus as defined in claim 28, wherein the maximum and minimum widths of said channel at said one end thereof respectively exceed and are less than said predetermined diameter.

30. Apparatus for transporting rod-shaped articles of predetermined diameter, particularly sections of tobacco-containing rods, comprising a conveying unit and a feeding unit, said feeding unit being arranged to deliver articles to said conveying unit and said feeding unit comprising a pneumatic tube wherein the articles are transported lengthwise, said conveying unit comprising at least two adjacent but spaced walls defining a channel wherein the articles are conveyed sideways and at least a portion of which has a width which is slightly less than said diameter, said channel having a first end and a second end and said conveying unit further comprising drive means for moving at least one of said walls from one end toward the other end of said channel to thereby transport the articles through the channel, and deflecting means for deflecting the leading ends of successive articles admitted by said feeding unit into the one end of said channel.

31. Apparatus as defined in claim 30, wherein said deflecting means comprises a guide face which is inclined with reference to and extends into the path of movement of successive articles admitted by said feeding unit.

32. Apparatus as defined in claim 30, wherein said guide face is of arcuate shape.

33. Apparatus as defined in claim 30, further comprising means for adjusting the position of said deflecting means with reference to said conveying unit.

34. Apparatus as defined in claim 30, wherein said deflecting means is movable.

35. Apparatus as defined in claim 34, wherein said deflecting means comprises a convex guide face which is turnable about a predetermined axis.

36. Apparatus as defined in claim 30, wherein said deflecting means comprises means for discharging at least one stream of compressed gas against the leading ends of successive articles admitted by said feeding unit to thereby deflect such articles sideways into said one end of said channel.